US011118639B1

(12) United States Patent
Cho et al.

(10) Patent No.: US 11,118,639 B1
(45) Date of Patent: Sep. 14, 2021

(54) CLUTCH CONTROL METHOD FOR VEHICLE

(71) Applicants: Hyundai Motor Company, Seoul (KR); Kia Motors Corporation, Seoul (KR)

(72) Inventors: Sung Hyun Cho, Yongin-si (KR); Dong Hyup Kang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/996,390

(22) Filed: Aug. 18, 2020

(30) Foreign Application Priority Data

Feb. 28, 2020 (KR) ........................ 10-2020-0025327

(51) Int. Cl.
*F16D 48/06* (2006.01)

(52) U.S. Cl.
CPC ...... *F16D 48/06* (2013.01); *F16D 2500/3065* (2013.01); *F16D 2500/30406* (2013.01); *F16D 2500/50287* (2013.01); *F16D 2500/70426* (2013.01); *F16D 2500/70626* (2013.01)

(58) Field of Classification Search
CPC ........... F16D 48/06; F16D 2500/30406; F16D 2500/3065; F16D 2500/50287; F16D 2500/3144; F16D 2500/25; F16D 2500/5126; F16D 2500/5122; F16D 2500/70426; F16D 2500/70428; F16D 2500/70626

See application file for complete search history.

(56) References Cited

U.S. PATENT DOCUMENTS

| 2013/0118855 A1* | 5/2013 | Hwang ................ B60W 10/115 192/85.63 |
| 2014/0121925 A1* | 5/2014 | Yoon ..................... B60W 10/02 701/68 |
| 2014/0277977 A1* | 9/2014 | Neelakantan ........... F16D 48/06 701/68 |
| 2014/0332333 A1* | 11/2014 | Yamawaki ............ F16H 61/143 192/3.28 |

FOREIGN PATENT DOCUMENTS

KR 10-2016-0058368 A 5/2016

* cited by examiner

*Primary Examiner* — Edwin A Young
(74) *Attorney, Agent, or Firm* — Morgan, Lewis & Bockius LLP

(57) ABSTRACT

A clutch control method for a vehicle may include determining, by a controller, whether a tip-in has occurred during an in-gear state of a transmission; increasing the clutch slip rapidly to a first target slip by the controller; feedback-controlling, by the controller, so that the clutch slip is reduced toward a second target slip during a predetermined first control time period after the increasing of the clutch slip; controlling, by the controller, a clutch of the transmission with a first target slip angular acceleration after the predetermined first control time period has elapsed; feedback-controlling by the controller so that target slip angular acceleration of the clutch gradually becomes zero during a predetermined second control time period; and feedback-controlling by the controller so that the clutch slip becomes a third target slip after the predetermined second control time period has elapsed.

20 Claims, 3 Drawing Sheets

CLUTCH CONTROL METHOD FOR VEHICLE

CROSS REFERENCE TO RELATED APPLICATION

The present application claims priority to Korean Patent Application No. 10-2020-0025327, filed Feb. 28, 2020, the entire contents of which is incorporated herein for all purposes by this reference.

BACKGROUND OF THE INVENTION

Field of the Invention

The present invention relates to a clutch control method for a vehicle, and more particularly, to a technology of controlling a clutch that controls power input to a transmission.

Description of Related Art

The Automated Manual Transmission (AMT) or Dual Clutch Transmission (DCT) is configured to input power from a power source such as an engine or a motor through a clutch, transmits the power through a synchromesh-type transmission mechanism, and outputs the power to an output shaft, contributing to improvement of fuel efficiency of a vehicle with high power transmission efficiency.

To ensure that power from the power source is transmitted to an input shaft of a transmission without loss, the clutch is controlled to be somewhat overly connected to the level configured for transmitting higher torque than the actual torque input from the power source, whereby it is common to maximally increase the power transmission efficiency.

However, in the above-described state, since a change in output torque of the power source is directly transmitted to drive wheels through the transmission, when a driver unexpectedly controls an accelerator pedal, e.g., performs a "tip-in", a shock to the vehicle is caused, reducing ride quality.

Whereas, in the case of a vehicle provided with a torque converter, since the torque converter absorbs and damps the change in output torque of the power source as described above, there is little concern about having the shock as described above.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a clutch control method for a vehicle, wherein, wherein, in the situation of an accelerator pedal tip-in by a driver, the method allows a clutch to perform a damping function similar to the function expected by a torque converter through control of the clutch, thus preventing a shock and improving ride quality of the vehicle, and ultimately increasing the vehicle's marketability.

A clutch control method for a vehicle according to an exemplary embodiment of the present invention includes: determining, by a controller, whether a tip-in has occurred during an in-gear state of a transmission; increasing clutch slip rapidly to a first target slip by the controller; feedback-controlling, by the controller, so that the clutch slip is reduced toward a second target slip during a predetermined first control time period after the increasing of the clutch slip; controlling, by the controller, a clutch of the transmission with a first target slip angular acceleration after the predetermined first control time period has elapsed; feedback-controlling by the controller so that target slip angular acceleration of the clutch gradually becomes zero during a predetermined second control time period; and feedback-controlling by the controller so that the clutch slip becomes a third target slip after the predetermined second control time period has elapsed.

In a case where the tip-in occurs during the in-gear state, the controller may further perform confirming driver's apparent intent to operate the tip-in according to an APS signal, so that the clutch slip may be increased rapidly only when the driver's apparent intent to operate the tip-in is confirmed.

The second target slip may be set at a level of 40 to 60% of the first target slip.

In the controlling the clutch slip to be reduced from the first target slip toward the second target slip, clutch torque for controlling the clutch may be determined by a formula: Clutch torque=Engine torque+Feedback torque+Tip-in correction torque, where Feedback torque=P Term (MAP (Error slip, Gear))+I Term (MAP (Error slip, Gear))*MAP (Engine torque)*MAP (Clutch Speed)+D Term (MAP (d(Error slip)/dt, Gear)).

In the controlling the target slip angular acceleration of the clutch to gradually become zero, the clutch torque for controlling the clutch may be determined by a formula: Clutch torque=Engine torque+Feedback torque, where Feedback torque=P Term (MAP (Error slip, Gear))+I Term (MAP (d(Error slip)/dt, Gear))*MAP (Engine torque)*MAP (Clutch speed)+D Term (MAP (d(Error slip)/dt, Gear)).

In controlling the clutch slip to become the third target slip, the clutch torque for controlling the clutch may be determined by a formula: Clutch torque=Engine torque+Feedback torque, where Feedback torque=P Term (MAP (Error slip, Gear))+I Term (MAP (Error slip, Gear))*MAP (Engine torque)*MAP (Clutch speed)+D Term (MAP (d(Error slip)/dt, Gear)).

After the predetermined second control time period has elapsed, while repeatedly performing the controlling the clutch slip to become the third target slip, the controller (CLR) may further perform determining whether the clutch slip maintains a state of being within a predetermined reference slip range for a predetermined reference time.

In the situation of the accelerator pedal tip-in by the driver, the present invention allows the clutch to perform the damping function similar to the function expected by a torque converter through control of the clutch, so that the present invention can prevent shock, improving the ride quality of the vehicle and ultimately increasing the vehicle's marketability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
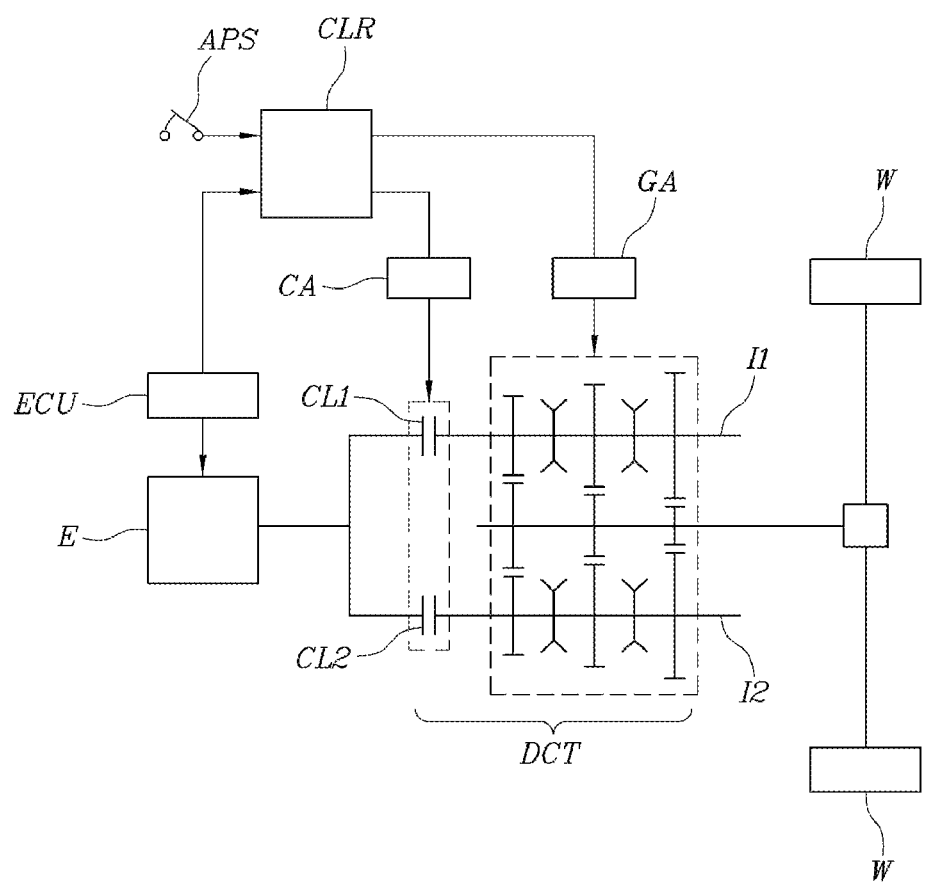
FIG. 1 is a view exemplarily illustrating a powertrain of a DCT-provided vehicle to which an exemplary embodiment of the present invention may be applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

FIG. 1 is a view exemplarily illustrating a powertrain of a dual-clutch transmission (DCT) vehicle to which an exemplary embodiment of the present invention may be applied, and power of an engine E is selectively provided to two input shafts I1 and I2 through two clutches CL1 and CL2 of the DCT, and the power that has been transmitted in the DCT is provided to drive wheels W.

The controller (CLR) is connected to an engine control unit ECU to receive information such as engine torque and to request reduction of the torque or the like to the engine E, and is connected for control of a clutch actuator CA that controls the two clutches of the DCT and a gear actuator GA that changes a gear engagement state of the DCT.

The controller (CLR) is configured to receive signals from an accelerator position sensor (APS), and is configured to receive rotation speed and the like of each of the input shafts I1 and I2 of the DCT.

The controller (CLR) may respectively determine slip amounts of the two clutches through the difference between speed of the engine E and rotation speed of each of the input shafts I1 and I2.

Figure 2:
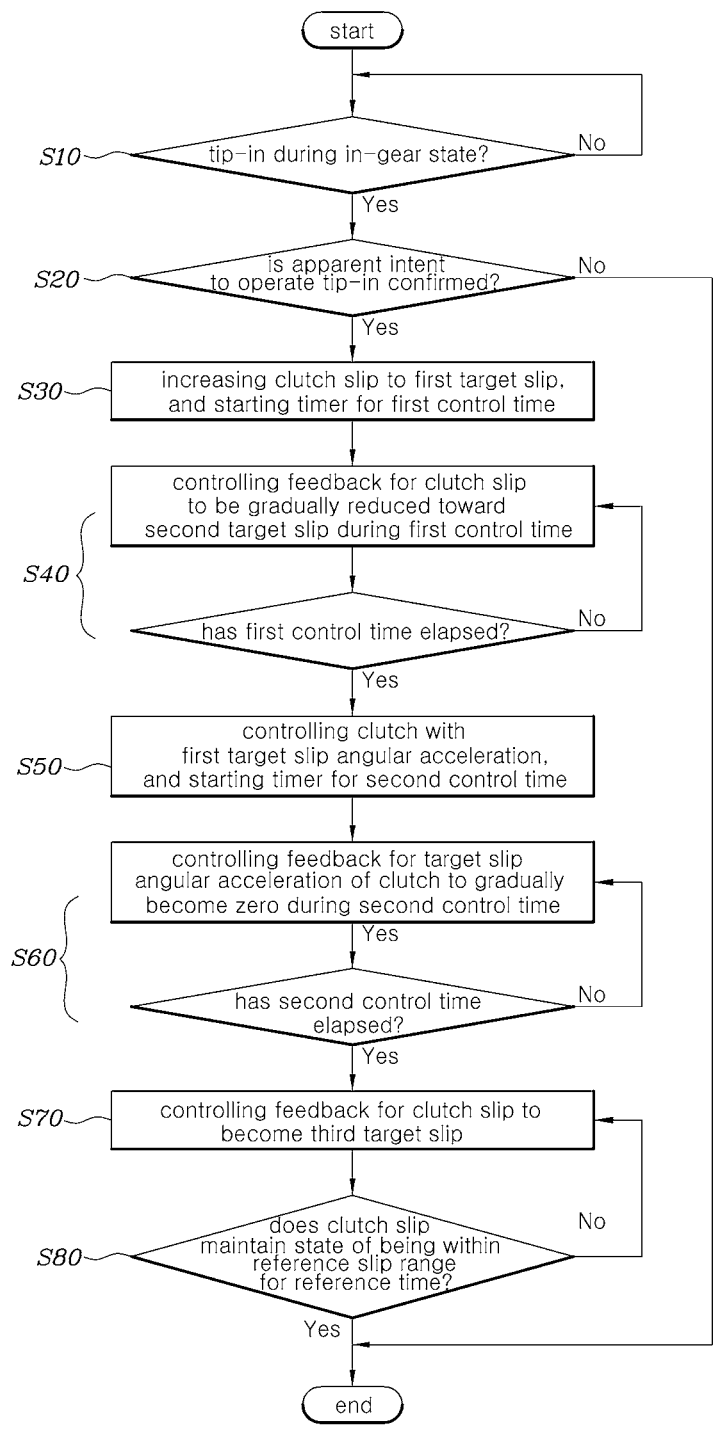
FIG. 2 is a flow chart illustrating an exemplary embodiment of a clutch control method for a vehicle according to an exemplary embodiment of the present invention.

Referring to FIG. 2, an exemplary embodiment of a clutch control method for a vehicle of the present invention includes: determining by the controller (CLR) whether a tip-in has occurred during an in-gear state in S10; confirming driver's apparent intent to operate the tip-in according to APS signal by the controller (CLR) in S20; increasing clutch slip rapidly to the first target slip by the controller (CLR) in S30; controlling feedback by the controller (CLR) so that the clutch slip is reduced toward the second target slip during a predetermined first control time period after the increase of the clutch slip in S40; controlling the clutch with first target slip angular acceleration by the controller (CLR) after the predetermined first control time period has elapsed in S50; controlling the feedback by the controller (CLR) so that the target slip angular acceleration of the clutch gradually becomes zero during a predetermined second control time period in S60; controlling the feedback by the controller (CLR) so that the clutch slip becomes the third target slip after the predetermined second control time period has elapsed in S70; and determining whether the clutch slip maintains a state of being within a predetermined reference slip range for a predetermined reference time by the controller (CLR) in S80.

That is, in an exemplary embodiment of the present invention, when the tip-in occurs during the in-gear state, the clutch slip is rapidly increased and then gradually decreased to finally return to the normal control state, whereby the clutch is allowed to generate slip against the driver's sudden tip-in. Accordingly, a shock absorbing function similar to that of the torque converter is performed to prevent the shock on the vehicle powertrain, whereby improving the ride quality and ultimately increasing the vehicle's marketability.

For reference, the in-gear state means a state in which a transmission gear of Automated Manual Transmission (AMT) or DCT is engaged, but is not in the middle of transmitting the gear, so that torque of the input shaft of the transmission is intactly transmitted to the output shaft of the transmission.

Meanwhile, in the case of DCT, "clutch" here means a clutch on the engaging side, in which power is currently transmitted from the engine to the drive wheels through the transmission.

Furthermore, the tip-in means that the driver starts to step on an accelerator pedal in a state where the driver does not step on the accelerator pedal.

In the case where the tip-in occurs during the in-gear state, the controller (CLR) perform confirming driver's apparent intent to operate the tip-in according to the APS signal in S20, so that the clutch slip is increased rapidly only when the driver's apparent intent to operate the tip-in is confirmed.

That is, in the present phase, under the situation whether the driver is actually tipping in to increase engine torque or the driver steps on and immediately steps off the accelerator pedal because of not intending to actually increase the engine torque or because of an erroneous operation, the control of the present invention is prevented from being performed even when the tip-in occurs during the in-gear state.

Therefore, in confirming the driver's apparent intent to operate the tip-in in S20, for example, in the case where the APS signal is operated at a level of at least 0.5 to 1%, the controller (CLR) may be made to determine that the driver has the apparent intent to operate the tip-in.

Figure 3:
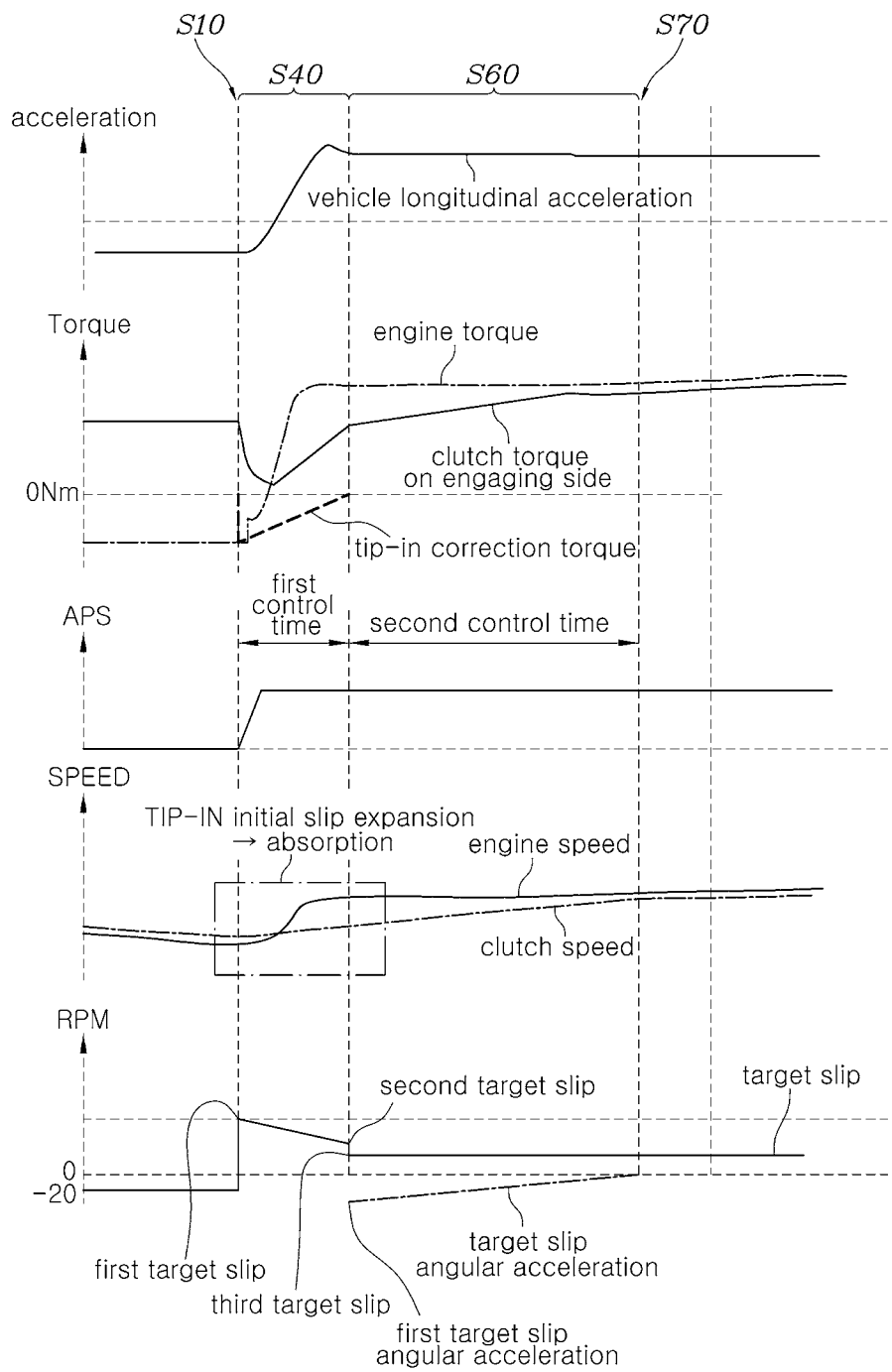
FIG. 3 is a graph illustrating an explanation of the clutch control method for the vehicle according to an exemplary embodiment of the present invention.

For reference, the graph of FIG. 3 represents that, since the engine is in a fuel cut state before the driver's tip-in, when the APS signal starts to increase by the driver's tip-in after being in a negative torque state, a slight response delay occurs, but immediately the torque rises to be a positively increased torque.

Thereafter, the controller (CLR) increases the clutch slip rapidly to the first target slip in S30 to make the engine torque to increase rapidly from a negative torque state to a positive torque state, whereby the controller controls to absorb and buffer the shock which is transmitted to the powertrain through the clutch.

The first target slip is a value which may be varied depending on the configuration of the vehicle's engine and powertrain, and may be determined by design through a number of experiments and analysis, and may be determined, for example, at a level of 150 to 200 RPM.

After increasing the clutch slip as described above, for a predetermined first control time period, the controller (CLR) performs the control of feedback so that the clutch slip is reduced toward the second target slip S40.

Here, the second target slip is set to a level of 40 to 60% of the first target slip.

That is, when the tip-in occurs during the in-gear state, the controller (CLR) greatly increases the clutch slip to the first target slip, and accordingly, during the first control time period, the controller gradually reduces the clutch slip to the second target slip which is about half the level of the first target slip.

Here, the predetermined first control time period may be changed by the engine of the vehicle and the inertia of the powertrain, and thus may be determined by design to a value suitable for the corresponding vehicle by a number of experiments and analysis. To maximally increase the absorption effects, the predetermined first control time period will be set to a relatively long time.

In the controlling the clutch slip to be reduced from the first target slip toward the second target slip, the clutch torque for controlling the clutch is determined by the following formula: Clutch torque=Engine torque+Feedback torque+Tip-in correction torque, where Feedback torque=P Term (MAP (Error slip, Gear))+I Term (MAP (Error slip, Gear))*MAP (Engine torque)*MAP (Clutch speed)+D Term (MAP (d(Error slip)/dt, Gear)).

That is, the controller (CLR) obtains a stroke of a clutch actuator for realizing the clutch torque determined as described above, and controls the clutch actuator accordingly, controlling the clutch slip as described above as a result.

Here, the feedback torque is a sum of P Term, I Term, and D Term, which means that PID control (Proportional Integral Derivative control) is performed as a result.

For reference, the "slip" of the clutch means the difference between engine speed and speed of an input shaft of the transmission, "Error slip" is a slip error that equals to a difference between the target slip and the actual slip, "gear" means a current transmission gear, and d(Error slip)/dt means the change rate of the slip error over time.

That is, the feedback torque is configured to be determined by a number of MAPs determined by a number of experiments and analysis on factors such as error slip, gear, an engine torque, clutch speed, change rate of slip error, and others.

Regarding the tip-in correction torque, since it is difficult to sufficiently secure the responsiveness of control that generates a rapid change of the clutch slip by use of only the feedback torque as described above, the tip-in correction torque is a correction torque which is required to realize a practical target slip.

That is, in the tip-in correction torque as illustrated in FIG. 3, when the clutch slip is increased to the first target slip, the tip-in correction torque is also rapidly generated, for example, about −20 to −30 N, and then may be set to sequentially and gradually become zero during the first control time period.

After increasing the clutch slip to the first target slip by the clutch torque determined by adding the tip-in correction torque as described above, while reducing the slip amount to the second target slip during the first control time period, it is preferable to prevent the clutch torque from becoming excessively small to be a completely open state past the touch point of the clutch.

That is, the present invention is to reduce the clutch torque during the predetermined first control time period to actively cause the clutch slip. However, in the case where the clutch torque becomes excessively small to reach the level at which the clutch is completely open past the touch point, a shock may occur while the clutch passes the touch point in a process of increasing the clutch torque afterward. Therefore, even when the clutch torque is to be reduced as described above, it is prohibited to reduce the clutch torque to the extent of passing the touch point of the clutch.

That is, while the clutch torque determined by the above formula is smaller than a predetermined lower limit torque determined as clutch torque in which the clutch is in a state of being slightly more engaged than passed the touch point, the lower limit torque is used, to control the clutch.

For reference, in FIG. 3, before the tip-in, the target slip has a negative value, which indicates that the clutch is in a state of being engaged more or less excessively to prevent the clutch slip from occurring in a state where the drag torque of the engine is operated with a negative value through a fuel cut. Whereas, after the tip-in is determined, it is indicated that the target slip is rapidly increased to the first target slip and gradually decreased to the second target slip during the predetermined first control time period to increase the clutch slip.

After the predetermined first control time period has elapsed, the controller (CLR) controls the clutch with the first target slip angular acceleration S50, and then controls the target slip angular acceleration of the clutch to gradually become zero during a predetermined second control time period S60.

This is for preventing a shock that occurs as the slip is reduced too abruptly after the controller reduces the slip to the second target slip.

That is, since the clutch slip is in a state of being reduced, the first target slip angular acceleration has a negative value; and controlling the value gradually to become zero causes the clutch slip to be decreased, but causes the decreasing acceleration to be gradually reduced to zero, whereby the clutch is smoothly engaged without any shock.

The first target slip angular acceleration may be set to a value suitable for a corresponding vehicle by a number of experiments and analysis in consideration of the engine capacity and the inertia of the powertrain, and may be set to a value of, for example, −5 RPM/10 ms, etc.

The predetermined second control time period is also appropriately set for the corresponding vehicle model in accordance with a number of experiments and analysis to be the time required to control the clutch in a way that the clutch is engaged without a shock by smoothly reducing the clutch slip according to the above-described purpose.

In the controlling the target slip angular acceleration of the clutch to gradually become zero, the clutch torque for controlling the clutch is determined by the following formula: Clutch torque=Engine torque+Feedback torque, where Feedback torque=P Term (MAP (Error slip, Gear))+I Term (MAP (d(Error slip)/dt, Gear))*MAP (Engine torque) *MAP (Clutch speed)+D Term (MAP (d(Error slip)/dt, Gear)).

That is, there is a difference in that all other portions in the present formula are the same as the reducing the clutch slip from the first target slip toward the second target slip, except that no tip-in correction torque is required and the determination of the I Term is made not by the slip error, but by the change rate over time of the slip error, and thus the slip is reduced during an excessively fast time as described above, preventing the shock from occurring.

Here, the target slip of the clutch during the predetermined second control time period may be determined to be about 20 to 30 RPM for normal clutch slip control.

Here, the normal clutch slip control means the control in a general driving situation rather than a special driving situation such as a tip-in situation or a transmission situation in which the control of the present invention may be started, meaning the control in a stable slip situation in which learning of the characteristics of the clutch may be performed.

When the predetermined second control time period has elapsed, the controller (CLR) performs controlling the clutch slip to become a third target slip in S70.

In the present phase, the clutch torque that controls the clutch is determined by the following formula: Clutch torque=Engine torque+Feedback torque, where Feedback torque=P Term (MAP (Error slip, Gear))+I Term (MAP (Error slip, Gear))*MAP (Engine torque)*MAP (Clutch speed)+D Term (MAP (d(Error slip)/dt, Gear)).

In the instant case, the third target slip may be set to a value less than or equal to a slip amount of about 20 to 30 RPM for the normal clutch slip control.

That is, in the case where, during the second control time period, the controller (CLR) controls the clutch slip, targeting to a level of 20 to 30 RPM as described above, but the clutch slip has not yet been satisfactorily reduced, the controlling of the clutch slip to become the third target slip is repeated, whereby the clutch slip is sufficiently reduced.

For reference, in the instant case, the I Term of the PID control is determined not by the change rate of the slip error, but by the slip error again.

As described above, while repeatedly controlling the feedback so that the clutch slip becomes the third target slip, when the controller (CLR) determines in S80 that the clutch slip is maintained within a predetermined reference slip range for a predetermined reference time, the controller (CLR) determines that the clutch slip has been sufficiently reduced and that the state is stable, whereby the control according to an exemplary embodiment of the present invention is ended.

Therefore, the reference slip range may be set to a value of around 20 RPM, according to the above-described purpose.

Furthermore, since the reference time may vary depending on the powertrain characteristics of the vehicle, by a number of experiments and analysis, the time at which the clutch slip may be determined to be sufficiently stable may be set by design.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A clutch control method for a vehicle, the method comprising:
    determining, by a controller, whether a tip-in has occurred during an in-gear state of a transmission;
    increasing, by the controller, clutch slip of a clutch in the transmission to a first target slip;
    feedback-controlling, by the controller, so that the clutch slip is reduced toward a second target slip during a predetermined first control time period after the increasing of the clutch slip;
    controlling, by the controller, the clutch of the transmission with a first target slip angular acceleration after the predetermined first control time period has elapsed;
    feedback-controlling by the controller so that a target slip angular acceleration of the clutch becomes zero at an end of a predetermined second control time period after the predetermined first control time period; and
    feedback-controlling by the controller so that the clutch slip becomes a third target slip after the predetermined second control time period has elapsed.

2. The method of claim 1, wherein, upon determining that the tip-in occurs during the in-gear state, the controller is further configured to perform confirming driver's intent to operate the tip-in according to an accelerator position sensor (APS) signal, so that the clutch slip is increased when the driver's intent to operate the tip-in is confirmed.

3. The method of claim 1, wherein the second target slip is 40 to 60% of the first target slip.

4. The method of claim 1, wherein, in the controlling the clutch slip to be reduced from the first target slip toward the second target slip, clutch torque for controlling the clutch is determined by a formula: Clutch torque=Engine torque+Feedback torque+Tip-in correction torque,
where Feedback torque=P Term (MAP (Error slip, Gear))+I Term (MAP (Error slip, Gear))*MAP (Engine torque)*MAP (Clutch Speed)+D Term (MAP (d(Error slip)/dt, Gear)).

5. The method of claim 1, wherein, in the controlling the target slip angular acceleration of the clutch to become zero, the clutch torque for controlling the clutch is determined by a formula: Clutch torque=Engine torque+Feedback torque, where Feedback torque=P Term (MAP (Error slip, Gear))+I Term (MAP (d(Error slip)/dt, Gear))*MAP (Engine torque) *MAP (Clutch speed)+D Term (MAP (d(Error slip)/dt, Gear)).

6. The method of claim 1, wherein, in controlling the clutch slip to become the third target slip, the clutch torque for controlling the clutch is determined by a formula: Clutch torque=Engine torque+Feedback torque, where Feedback torque=P Term (MAP (Error slip, Gear))+I Term (MAP (Error slip, Gear))*MAP (Engine torque)*MAP (Clutch speed)+D Term (MAP (d(Error slip)/dt, Gear)).

7. The method of claim 1, wherein, after the predetermined second control time period has elapsed, while repeatedly performing the controlling the clutch slip to become the third target slip, the controller further performs determining whether the clutch slip maintains a state of being within a predetermined reference slip range for a predetermined reference time.

8. The method of claim 1, wherein the first target slip is controlled to be linearly decreased to the second target slip.

9. The method of claim 1, wherein the target slip angular acceleration of the clutch is controlled to be linearly increased to become zero at the end of the predetermined second control time period.

10. The method of claim 1, wherein the controller includes:
a processor; and
a non-transitory storage medium on which a program for performing the method of claim 1 is recorded and executed by the processor.

11. A non-transitory computer readable medium on which a program for performing the method of claim 1 is recorded.

12. A transmission comprising:
a first input shaft selectively connectable to an engine by a first clutch;
a second input shaft selectively connectable to the engine by a second clutch;
a plurality of gears mounted on the first input shaft and the second input shaft;
a clutch actuator engaged to the first and second clutches and configured of controlling the first and second clutches;
a gear actuator engaged to the plurality of gears and configured of changing a gear engagement between the plurality of gears for gear shifting; and
a controller connected to the clutch actuator and the gear actuator and including a processor and a non-transitory storage medium on which a program is recorded, the program executed by the processor and configured of performing:
determining whether a tip-in has occurred during an in-gear state of the transmission;
increasing clutch slip of at least one of the first and second clutches to a first target slip;
feedback-controlling so that the clutch slip is reduced toward a second target slip during a predetermined first control time period after the increasing of the clutch slip;
controlling the at least one of the first and second clutches of the transmission via the clutch actuator with a first target slip angular acceleration after the predetermined first control time period has elapsed;
feedback-controlling so that a target slip angular acceleration of the at least one of the first and second clutches becomes zero at an end of a predetermined second control time period after the predetermined first control time period; and
feedback-controlling so that the clutch slip becomes a third target slip after the predetermined second control time period has elapsed.

13. The transmission of claim 12, wherein, upon determining that the tip-in occurs during the in-gear state, the controller is further configured to perform confirming driver's intent to operate the tip-in according to an accelerator position sensor (APS) signal, so that the clutch slip is increased when the driver's intent to operate the tip-in is confirmed.

14. The transmission of claim 12, wherein the second target slip is 40 to 60% of the first target slip.

15. The transmission of claim 12, wherein, in the controlling the clutch slip to be reduced from the first target slip toward the second target slip, clutch torque for controlling the at least one of the first and second clutches is determined by a formula: Clutch torque=Engine torque+Feedback torque+Tip-in correction torque,
where Feedback torque=P Term (MAP (Error slip, Gear))+I Term (MAP (Error slip, Gear))*MAP (Engine torque)*MAP (Clutch Speed)+D Term (MAP (d(Error slip)/dt, Gear)).

16. The transmission of claim 12, wherein, in the controlling the target slip angular acceleration of the at least one of the first and second clutches to become zero, the clutch torque for controlling the at least one of the first and second clutches is determined by a formula: Clutch torque=Engine torque+Feedback torque, where Feedback torque=P Term (MAP (Error slip, Gear))+I Term (MAP (d(Error slip)/dt, Gear))*MAP (Engine torque)*MAP (Clutch speed)+D Term (MAP (d(Error slip)/dt, Gear)).

17. The transmission of claim 12, wherein, in controlling the clutch slip to become the third target slip, the clutch torque for controlling the at least one of the first and second clutches is determined by a formula: Clutch torque=Engine torque+Feedback torque, where Feedback torque=P Term (MAP (Error slip, Gear))+I Term (MAP (Error slip, Gear)) *MAP (Engine torque)*MAP (Clutch speed)+D Term (MAP (d(Error slip)/dt, Gear)).

18. The transmission of claim 12, wherein, after the predetermined second control time period has elapsed, while repeatedly performing the controlling the clutch slip to become the third target slip, the controller further performs determining whether the clutch slip maintains a state of being within a predetermined reference slip range for a predetermined reference time.

19. The transmission of claim 12, wherein the first target slip is controlled to be linearly decreased to the second target slip.

20. The transmission of claim 12, wherein the target slip angular acceleration of the at least one of the first and second clutches is controlled to be linearly increased to become zero at the end of the predetermined second control time period.

* * * * *